US012746579B2

(12) United States Patent
Dadlani

(10) Patent No.: US 12,746,579 B2
(45) Date of Patent: Sep. 29, 2026

(54) MATERIALS DETECTOR

(71) Applicant: ISHITVA ROBOTIC SYSTEMS PVT LTD, Ahmedabad (IN)

(72) Inventor: Jitesh Dadlani, Ahmedabad (IN)

(73) Assignee: ISHITVA ROBOTIC SYSTEMS PVT LTD, Ahmedabad (IN)

(*) Notice: Subject to any disclaimer, the term of this patent is extended or adjusted under 35 U.S.C. 154(b) by 459 days.

(21) Appl. No.: 18/549,142

(22) PCT Filed: Mar. 4, 2022

(86) PCT No.: PCT/IN2022/050192
§ 371 (c)(1),
(2) Date: Sep. 5, 2023

(87) PCT Pub. No.: WO2022/185340
PCT Pub. Date: Sep. 9, 2022

(65) Prior Publication Data

US 2024/0157403 A1 May 16, 2024

(30) Foreign Application Priority Data

Mar. 4, 2021 (IN) ............................ 202121009106

(51) Int. Cl.
*B07C 5/342* (2006.01)

(52) U.S. Cl.
CPC ...... *B07C 5/342* (2013.01); *B07C 2501/0054* (2013.01)

(58) Field of Classification Search
CPC ........................ B07C 5/342; B07C 2501/0054
See application file for complete search history.

(56) References Cited

U.S. PATENT DOCUMENTS 10,898,927 B2 1/2021 Ripley et al.
2014/0244027 A1* 8/2014 Green .................... C07C 51/41 700/223

(Continued)

FOREIGN PATENT DOCUMENTS

RU 2693727 7/2019

OTHER PUBLICATIONS

PCT Application PCT/IN2022/050192, International Search Report, Jun. 20, 2022.

*Primary Examiner* — Kyle O Logan
(74) *Attorney, Agent, or Firm* — KNH LLP

(57) ABSTRACT

The present invention discloses a material detector (100) used to identify a waste material irrespective of a state/condition of the waste material. The material detector (100) includes one or more sensors (110), a detection unit (120) and a comparison unit (130). The sensors (110) capture data of an outermost layer of at least one waste material. The detection unit (120) is configured to determine one or more identity parameters of the waste material by analyzing the data. A relationship table (10) of the comparison unit (130) includes a predefined relation between at least two columns of the relationship table (10). The comparison unit (130) determines a classifier of the waste material from the relationship table (10) using the predefined relation that maps the one or more identity parameters of the waste material with other features of the waste material, thereby accurately identifying the waste material.

11 Claims, 4 Drawing Sheets

(56) References Cited

U.S. PATENT DOCUMENTS

| | | | | |
|---|---|---|---|---|
| 2015/0081090 | A1 | 3/2015 | Dong | |
| 2018/0100810 | A1* | 4/2018 | Sahu | G01N 21/94 |
| 2020/0222949 | A1* | 7/2020 | Murad | G06N 3/08 |
| 2023/0011383 | A1* | 1/2023 | Balthasar | G06V 10/764 |

* cited by examiner

10

| Classifier | Identity parameter (Brand) | Identity parameter (Product) | Feature 1 (Chemical Composition / Structure) | Feature 2 (Use-case) | Feature 3 (MFI) | ... | Feature n (Manufacturing method/ type) |
|---|---|---|---|---|---|---|---|
| IMSC1 | Brand100001, ..., Brand10000n | Tetra pack | Layer 1: BOPP<br>Layer 2: LDPE<br>Layer 3: BOPP<br>...<br>Layer n: Surlyn | Food grade | | ... | - |
| IMSC 2 | Brand200001 | | Material: HDPE | Non-food grade | High MFI | ... | Blow molded |
| IMSC 3 | Brand301, ..., Brand30n | Oil Containers | Material: PET | Oil | | ... | Injection molded |
| IMSC 4 | Brand4001, ..., Brand400n | Milk Packet | Material: HDPE (Film Grade) | Food grade | | | Molding grade |
| IMSC 5 | Brand5001, ..., Brand500n | | Material: PP Impact Copolymer | | Low MFI | | Blow molded |
| ... | ... | | ... | ... | | ... | ... |
| IMSCn | Brandn00001, ..., Brandn0000n | Water bottle | Layer 1: Polyethylene<br>Layer 2: Polyethylene<br>Layer 3: Aluminum<br>Layer 4: Polyethylene<br>Layer 5: Paper Board<br>...<br>Layer n: Polyethylene | Food grade | | ... | - |

Fig. 2

MATERIALS DETECTOR

FIELD OF INVENTION

The present invention relates to a material detector. More specifically, the present invention relates to an automated material detector for identifying a waste material from a mixed waste stream.

BACKGROUND

It is a widely known fact that recycling of waste materials is an eco-friendly practice and should be promoted for a sustainable future. Compared to manufacturing new plastic, recycling plastic (or waste materials) saves about 88% resources. Due to the said reason, it is always advisable for industries to opt for recycling.

The recycling process for a particular industry requires waste materials from the same or equivalent industry/usage be recycled to make recycled products/items. For example, food industry requires food grade plastics to be segregated from a mixed waste of different variety of plastics and other items. Examples of food grade plastics include plastics used for storing, packaging and/or processing food or beverages. Similarly, oil industry requires oily plastics (i.e. plastic material previously used in the oil or similar industry) to be segregated from the mixed waste of different variety of plastics and other items.

A materials recovery facility (MRF) is a specialized plant that receives, separates and prepares recyclable materials from the mixed waste.

Every MRF plant operates on the ability to differentiate between two different waste materials based upon one or more parameters. Because most of the downstream recycling processes are based upon the chemical composition (for example, chemical makeup, associated use leading to specific exposure like food, oil, chemicals, etc.), it is very important that the MRF plant identifies and segregates the waste material based on the same or else the efficiency of the downstream processes and/or the interests of the end-user are compromised.

Conventional waste sorters have a number of limitations. First being that the conventional waste sorters can only identify and segregate the composite waste material based upon the chemical composition of the outer most layer of the composite waste material. For example, waste materials 'A' and 'B' having the same outer most layer are segregated in one container even though their respective inner layers are different. While this may work for waste materials made of a single layer of material with/without uniform chemical composition, the segregation of multi-layered waste materials still remains an unsolved problem. Further, due to the said inability of the waste sorters to segregate composite waste materials based upon their respective inner layers, the downstream recycling processes are compromised.

The incorrect identification problem is further aggravated by the presence of soiled (dirt, oil, etc.) outer most layer. Such soiled layers lead to improper and/or false identification and subsequent incorrect sorting thereby, further compromising the downstream recycling processes.

Second limitation pertains to segregation of similar materials from different materials. For example, the conventional waste sorters can easily identify PET polymer waste from HDPE polymer waste. However, said waste sorters cannot differentiate between similar materials from different industries. To elaborate on the said example, the conventional waste sorters cannot differentiate between plastic waste from food industry and plastic waste from oil industry. Using recycled oily plastics in the food industry may pose several health hazards to the end user of the said products. Hence, accurate identification leading to desirable sorting of waste materials is imperative for quality sensitive recycled products. The said limitation of the conventional waste sorter prohibits a large number of industries to adopt recycling practices.

To solve the above problems, many solutions have been proposed including addition of chemical marker/watermark, etc. to the different materials/packaging for their easy identification and subsequent sorting in the MRF plant. However, the proposed solutions require significant changes across the consumption value chain making their uniform adoption very challenging. Further, it requires unanimous participation from significant number of stakeholders and also requires large capital investments.

Therefore, there arises a requirement of an automated material detection system, which overcomes the aforementioned challenges associated with the conventional waste sorters.

SUMMARY

The present invention relates to a material detector used to identify a waste material irrespective of a state/condition of the waste material. The material detector includes one or more sensors, a detection unit and a comparison unit. The sensors capture data of an outermost layer of at least one waste material. The detection unit is configured to determine one or more identity parameters of the waste material by analyzing the data. The detection unit is configured to analyze the data by deriving a digital fingerprint based on at least one physical parameter and/or chemical parameter extracted from the data. The digital fingerprint is compared with predefined detectable physical parameters and/or chemical parameter of the outermost layer stored in a product database to determine the one or more identity parameters. The product database includes the one or more identity parameters corresponding to the predefined detectable physical parameters and/or chemical parameters of the outermost layer of the waste material. A relationship table of the comparison unit includes a predefined relation between at least two columns of the relationship table. The comparison unit determines a classifier of the waste material from the relationship table using the predefined relation that maps the one or more identity parameters of the waste material with other features of the waste material, thereby accurately identifying the waste material. A method to identify a waste material irrespective of its state/condition of the waste material by using the material detector is also disclosed.

The foregoing features and other features as well as the advantages of the invention will become more apparent from the following detailed description, which proceeds with reference to the accompanying figures.

BRIEF DESCRIPTION OF DRAWINGS

The summary above, as well as the following detailed description of illustrative embodiments, is better understood when read in conjunction with the apportioned drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale.

FIG. 2 depicts a relationship table 10 of a comparison unit of a material detector in accordance with an embodiment of the present invention.

DETAILED DESCRIPTION OF THE DRAWINGS

Figure 1:
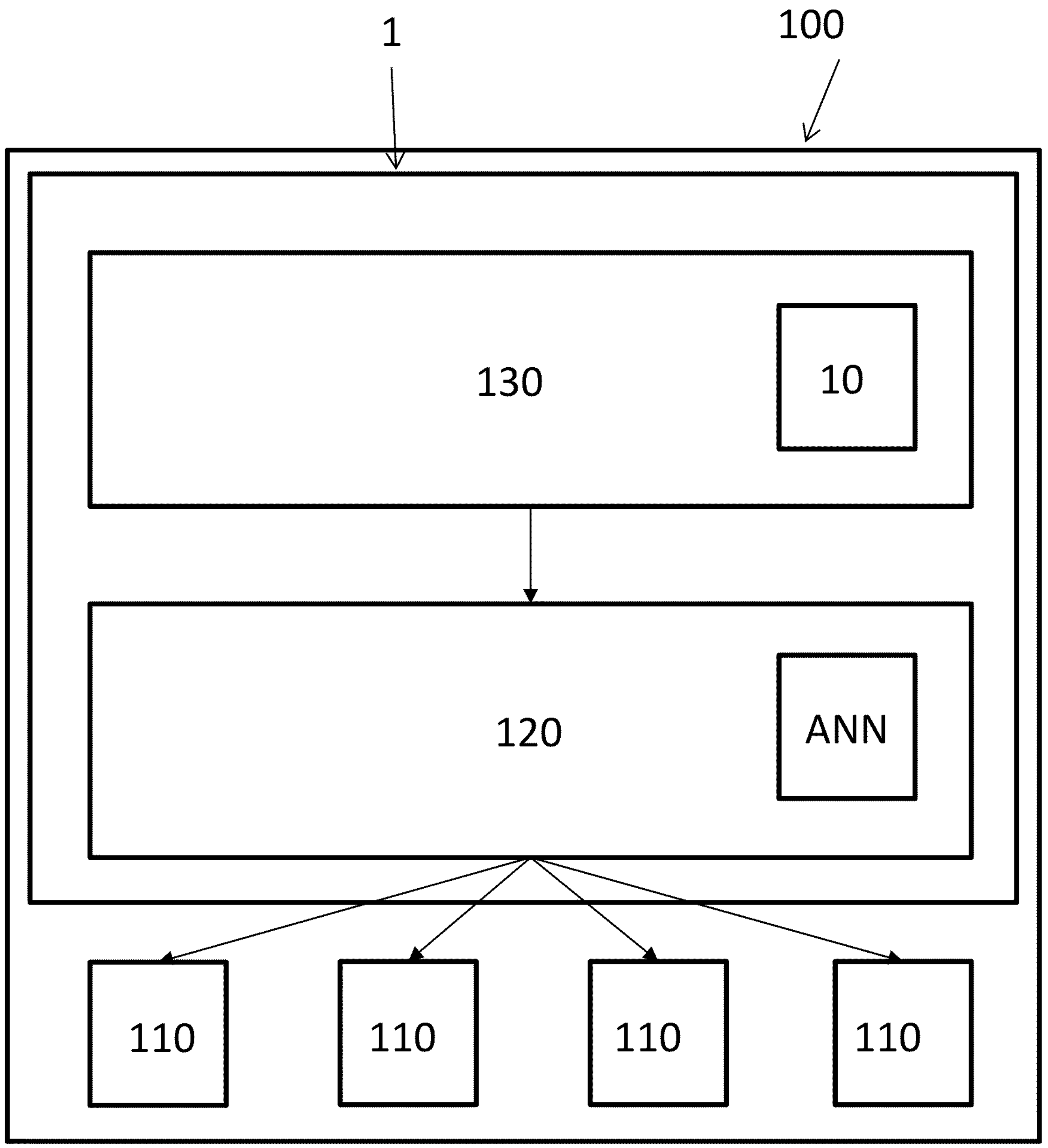
FIG. 1 depicts a material detector 100 in accordance with an embodiment of the present invention.

Prior to describing the invention in detail, definitions of certain words or phrases used throughout this patent document will be defined: the terms "include" and "comprise", as well as derivatives thereof, mean inclusion without limitation; the term "or" is inclusive, meaning and/or; the phrases "coupled with" and "associated therewith", as well as derivatives thereof, may mean to include, be included within, interconnect with, contain, be contained within, connect to or with, couple to or with, be communicable with, cooperate with, interleave, juxtapose, be proximate to, be bound to or with, have a property of, or the like; Definitions of certain words and phrases are provided throughout this patent document, and those of ordinary skill in the art will understand that such definitions apply in many, if not most, instances to prior as well as future uses of such defined words and phrases.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Although the operations of exemplary embodiments of the disclosed method may be described in a particular, sequential order for convenient presentation, it should be understood that the disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed herein. Moreover, for the sake of simplicity, the attached figures may not show the various ways in which the disclosed system, method, and apparatus can be used in combination with other systems, methods, and apparatuses.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments. These features and advantages of the embodiments will become more fully apparent from the following description and apportioned claims, or may be learned by the practice of embodiments as set forth hereinafter.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program.

In accordance with the present disclosure, an automated material detector (or material detector) is disclosed. The material detector of the present invention is capable of accurately determining/identifying waste materials (or classifier) from a mixed waste stream. The waste material corresponds to a waste material having a predefined category. The term 'mixed waste stream' in the below description corresponds to a heterogeneous or homogeneous waste stream having household, economic and/or commercial value. The mixed waste stream includes a mixture of different types/categories of wastes (or waste materials) as received from a pre-defined waste generation source. The different types of waste may include without limitation plastic, paper, films, glass, rubber, metal, electronic waste, tetra pack, multi-layer packaging (MLP), cardboard, etc.

The determined waste material may be processed as per requirements of the user. In an exemplary embodiment, the determined waste material is subsequently segregated in an MRF (material recovery facility). In another exemplary embodiment, the determined (waste) material is subsequently segregated in a quality control (QC) process. The predefined category of waste materials may include without limitation one or more multi-layered composite materials, one or more materials from same industry or having closely related application in one or more industries, one or more materials having similar manufacturing techniques, one or more materials having similar melt flow indexes (MFI), etc. The one or more multi-layered composite materials may include at least two layers with each layer having a different chemical composition. The composite material may be flexible or rigid, preferably flexible. The material detector may be used with any waste sorter available in a Material Recovery Facility (MRF).

Although the present invention has been described with examples of composite materials and/or plastic materials, the teachings of the present invention can be applied to non-composite materials and/or non-plastic materials as well.

The material detector of the present invention automates determination of different predefined categories (classifiers) of waste materials without compromising on accuracy of determination. Due to the ability of the material detector to accurately identify the type of waste material (classifier) taking into consideration various factors like application areas, number of layers, etc., it finds application in various segregation-based applications like MRF plant, QC plants, etc. For example, the material detector of the present invention can easily identify plastic from food industry or plastic from oil industry for subsequent segregation of the said plastic materials in a MRF plant, thereby increasing the efficiency of the MRF plant and subsequent downstream processes. Such efficient and accurate segregation of waste materials improves recyclability of a material and encourages industries to adopt recycling practices.

As shown in FIG. 1, the material detector 100 of the present invention provides an easy to implement solution of an age-old problem of accurately identifying different composite materials in a mixed waste stream which may thereafter be segregated, sorted, etc. as per end applications. The material detector 100 of the present invention includes various components that are operatively coupled to each other. In an embodiment, the material detector 100 helps to identify a waste material from in a mixed waste stream irrespective of a state/condition of the waste material. The state/condition of the one or more waste material includes but is not limited to an intact/complete state (for example, as intended by a manufacturer), a distorted state (for example, in a crumpled or crushed condition, discoloration due to chemical/radiation exposure), a torn/partial state (for example, partial wrapper/packaging), a soiled state (for example, dirty and/or oily), an environmental lighting condition, a background color, etc. The components include without limitation one or more sensors 110, a detection unit 120, a comparison unit 130, etc.

The detection unit 120 and the comparison unit 130 of the material detector 100 may be hosted on any appropriate hardware 1 (as shown in FIG. 1). The appropriate hardware 1 may include an onsite computer or a server accessible via a network. The one or more sensors 110 and/or a segregation means (described below in detail) may communicate with the detection unit 120 and the comparison unit 130 via a wired or wireless medium including Ethernet, Bluetooth, Wi-Fi, Infrared, etc.

If the detection unit 120 and the comparison unit 130 are hosted on an onsite computer, the appropriate hardware 1 may at least include a non-volatile storage, a volatile memory, a processor, and a human interface device. If the detection unit 120 and the comparison unit 130 are hosted on the server, the appropriate hardware 1 may at least include a web application server. The web application server may be accessed via any network attached human interface device.

The one or more sensors 110 may include but not limited to any device capable of capturing one or more images of an outermost layer of the one or more waste materials. In an embodiment, the material detector 100 includes a single sensor 110 for capturing one or more images of the one or more waste materials. Alternately, the material detector 100 may include a plurality of sensors 110 that are positioned at different locations for capturing one or more images of the waste material(s) from different angles such that one or more images of each of the waste material(s) is captured.

The sensors 110 may be in the form of an RGB optical camera (2D and/or 3D), an X-ray detector, a NIR camera, an Infrared camera, a SWIR camera, a LIDAR sensor, a height/depth sensor or a combination thereof. In an embodiment, the sensor 110 is a single RGB optical camera. The image(s) captured by the sensor(s) 110 may be colored, greyscale, black and white, etc.

The sensor 110 enables the material detector 100 to capture a large area (2D and/or 3D), instead of a line (1D). In an exemplary embodiment, the large area corresponds to a predefined area of a conveyor belt carrying the one or more waste materials to be identified. The sensor 110 may capture image(s) of an outermost layer of the waste material(s).

As an optional embodiment, the sensor 110 may be capable of capturing spectroscopic data of the outermost layer of the one or more waste materials for subsequent efficient analysis. The spectroscopic data may aid in determining the chemical properties of the outermost layer of the waste material to be detected.

The sensor(s) 110 is configured to capture the image and/or spectroscopic data (hereon collectively referred as 'data') of an outermost layer of the waste material and transmit the captured data to the detection unit 120.

The detection unit 120 processes the data received from the one or more sensors 110 using processing capabilities of say, a processor, a neural network, etc. In an embodiment, the detection unit 120 of the material detector 100 includes a neural network 'ANN'. Alternatives of neural network like deep learning, vision algorithm or any other functionally equivalent algorithm is within the scope of the teachings of the present invention.

Artificial neural networks (ANNs) are computational tools capable of machine learning. The artificial neural networks may be referred to as neural networks. Artificial neural networks include many interconnected computing units "neurons" that adapt to data or get trained as per the data and subsequently, work together to produce predictions in a model that to some extent resembles processing in biological neural networks.

In some neural networks, each neuron of a layer has a connection to each neuron in a following layer. Such neural networks are known as fully connected networks. The training data is used to let each connection to assume a weight that characterizes strength of the connection. Some neural networks comprise both fully connected layers and layers that are not fully connected. Fully connected layers in a convolutional neural network may be defined to as densely connected layers.

In some neural networks, signals propagate from the input layer to the output layer strictly in one way, meaning that no connections exist that propagate back toward the input layer. Such neural networks are known as feed forward neural networks. In case connections propagating back towards the input layer do exist, the neural network in question may be referred to as a recurrent neural network.

The neurons employ machine learning which explores the design of algorithms that can learn from data. Machine learning algorithms adapt to inputs to build a model, and can then be used on new data to make predictions.

Though the present invention has been explained by way of a neural network, it should be noted that the functionalities of the neural network of the detection unit 120 may be replaced with a processor and is also within the scope of the present invention.

The neural network (ANN) analyzes the data (image and/or spectroscopic data) captured by the sensor(s) 110 by using a processor configured to execute the detection unit 120 of the material detector 100. The neural network (ANN) of the detection unit 120 of the material detector 100 helps to accurately determine one or more identity parameters of the waste material(s) by analyzing the data transmitted by the sensor 110. The processing capabilities associated with the neural networks (ANN) of the detection unit 120 help to perform analysis of the image(s) as transmitted by the sensor 110. Analysis of the image includes breaking down the image(s) into a plurality of neural bits. Neural bit may be defined as a small data container including one or more physical parameters and/or chemical parameters extracted from the data provided by the sensor(s) 110. Each neural bit of each of the one or more waste materials may be fed into the neural network (ANN) of the detection unit 120. The neural network (ANN) then adds the neural bits on the basis of a probability function to derive a threshold value. The threshold value may be defined as a digital fingerprint which may be derived based on at least one physical parameter and/or chemical parameter extracted from the data of the one or more waste material.

Alternately, in place of neural network, the data may be analyzed (processing of spectroscopic data and/or image) by a processor and a digital fingerprint is derived based on to at least one physical parameter and/or chemical parameter associated with the one or more waste material.

During analysis, the digital fingerprint as derived, is compared with one or more parameters stored in a product database. The one or more parameters stored in the product database may include one or more predefined detectable physical and/or chemical parameters of the outermost layer of the one or more waste materials. Each of the one or more identity parameters may correspond to the predefined detectable physical parameters and/or chemical parameters of the outermost layer of the waste material. The physical parameters may include one or more of a design, a color, a size (dimensions), a pre-introduced marker, a tracing pointer, a shape, a graphics/design/pattern/texture present on a label/wrapper/surface, etc. of the waste material to be identified.

The chemical parameters may include one or more of a chemical composition of the outermost layer of the waste material to be detected or characteristic chemical signatures (like, NIR markers).

The product database is continuously updated by training the detection unit 120 with a plurality of predefined items/objects using a vision system to identify existing items like without limitation, products currently in use and/or sold in the market.

The said comparison yields the one or more identity parameters of the one or more waste materials captured by the sensors 110.

The identity parameters may include but not limited to brand (manufacturing company), product type (juice box, milk packets, chips packets, cosmetic containers, reagent bottles, etc.), product SKUs (year of manufacture, design revisions, geographical specific data), etc.

In an exemplary embodiment, the detection unit 120 determines brand, product type, product SKUs, and color/opacity (identity parameters) of the waste material captured by the sensors 110 based on the shape, size, color (RGB values), and graphics/design/pattern/texture present on a label/wrapper/surface (physical parameters) of the image or data provided by the sensor.

The digital fingerprint created by the detection unit 120 may be complete for an intact waste material or the digital fingerprint may be partial for a distorted/soiled/torn, etc. waste materials. The detection unit 120 is capable of predicting the one or more identity parameters based upon partial digital fingerprint. The detection unit 120 may determine a probability of similarity between the physical and/or chemical parameters in the product database and the complete/partial digital fingerprint. Hence, when the digital fingerprint is partial, the detection unit 120 accurately detects the one or more identity parameters of the one or more waste materials.

Additionally or optionally, the detection unit 120 may consider an industry standard and/or commonly/widely used material for a particular product type (milk, ketchup, juice, chips, etc.) to help the detection unit 120 identify the unknown/new waste material that is not yet added to the product database.

The detection unit 120 may be a supervised, semi-supervised and/or unsupervised learning system, i.e. the detection unit 120 may be further trained to determine the one or more identity parameter of new waste material (for example, a new product launched in a market, a new manufacturing technique, etc.). For example, the detection unit 120 may not be able to determine an unknown brand of a juice box that is not yet added to the product database. But the detection unit 120 may treat it as one of the known brands of juice boxes that share one or more common physical and/or chemical parameters like a graphic of a fruit and/or chemical composition of the outermost layer.

The identity parameter(s) detected by the detection unit 120 are further transmitted to the comparison unit 130 for further identification of the one or more waste materials and categorization of the same.

The detection unit 120 of the material detector 100 may also determine a positional information of each of the one or more waste material in their corresponding image data. The positional information may be used by the segregation means 500 to accurately and selectively segregate the one or more waste materials.

The comparison unit 130 may be preconfigured or instructed in real-time to classify the one or more waste materials within one or more classifiers based upon the determined identity parameter(s). The comparison unit 130 may be instructed by an end user and/or a computer algorithm.

The comparison unit 130 may include one or more relationship tables 10 (as shown in FIG. 2), each having one or more columns. The one or more columns may include but not limited to a classifier, the identity parameters, and one or more other features (feature 1, feature 2, . . . , feature n), or a combination thereof. The one or more column may each have 'n' number of rows/data, where 'n' corresponds to a natural number. The relationship tables 10 of the comparison unit 130 may be created using any database management systems including but not limited to MongoDB, MySQL, etc.

The one or more other features may include predetermined derivative data based on the identity parameters. For example, the one or more other feature columns may include a plurality of use-case feature (for example, food grade from food industries, non-food grade from other industries, oil from oil industries, chemical from chemical industries, etc.), a plurality of manufacturing technique/type feature (for example, film grade, extrusion grade, molding grade, injection molded, blow molded, etc.), chemical composition/structure, Material Flow Indexes (high MFI, low MFI), etc. The food grade feature may correspond to waste materials commonly associated with food and beverage industry like food boxes, beverage bottles, etc. Similarly, the oil feature may correspond to waste materials commonly associated with oil and oil based products like oil jars and pouches, etc.

The blow molding feature may correspond to waste materials that were manufactured by blow molding, the waste materials including soft drink bottles, water bottles, etc. The film grade polymer may include but is not limited to a milk film, a water pouch, an edible oil film, a shrink film, an air bubble film, a stretch cling film, a lamination film, an agriculture film, a foam film, etc. Similarly, as an example, an extrusion grade polymer may include a drip lateral while a molding grade polymer may include a food container, a soft lid, etc.

The chemical composition/structure may each correspond to a chemical composition of each layer of composite materials. Additionally or optionally, the chemical composition/structure column may include a chemical composition of non-composite materials.

The examples of the one or more other feature columns of the relationship table 10 described above are provided for clear understanding of the present invention. Other features may be created/defined with respect to the growing variety of products available in the market and/or the interests of the end-user. The same is within the scope of the teachings of the present invention.

The relationship table 10 may have a predefined relation between at least two columns of the relationship table 10. The predefined relation helps the comparison unit 130 to map the one or more identity parameters of the waste material with other features of the waste material. In an exemplary embodiment as depicted in FIG. 2, the predefined relationship between the columns of the relationship table 10 is "one classifier related to one or more identity parameters (brand, product type, etc.) having the same one or more other features". The predefined relation helps the comparison unit 130 to assign a classifier to the one or more waste materials.

Based on the determined identity parameters communicated by the detection unit 120, the comparison unit 130 determines the classifier of the one or more waste materials from the relationship table 10 using the predefined relation. In an embodiment, all the waste materials present in the images captured by the one or more sensors 110 are assigned respective classifiers by the comparison unit 130 of the material detector 100.

Additionally or optionally, the comparison unit 130 may consider the requirements of the end user to selectively assign one or more classifiers as per the requirements of the end user.

The comparison unit 130 may parse the relationship table 10 by using a processor to classify the identified waste material. In an exemplary embodiment, the comparison unit 130 selectively assigns a classifier to respective waste materials having a brand (identity parameter) with two different layers of polymer (chemical composition/structure). In another exemplary embodiment, the comparison unit 130 selectively assigns a classifier to respective waste materials having a product type and product SKUs (identity parameters) with food grade use-case and MFIs (other features). Hence, the material detector 100 is a one stop solution to alleviate limitations in detection of complex chemical compositions/structure of composite materials as well as uncovers historical/hidden information pertaining to the waste materials.

The historical/hidden information may correspond to information not captured by the one or more sensors 110, for example the other features of the relationship table 10. In other words, for example, the material detector 100 is able to determine chemical composition/structure of inner layers of a composite waste material (like multi layered plastics) solely based on the data captured by the sensors 110 of the outermost layer of the waste material. This enables the material detector 100 to be used for detecting one or more multi-layered composite materials which encourages the industries to participate in recycling practices of their products. This will further lead to significant reduction in the environmental burden resulting from non-recycled waste being dumped in the nature.

Thereafter, the determined classifier of the waste material in the captured image is communicated to any operationally coupled segregation means of a MRF plant for subsequent segregation of the classified waste material. In an exemplary embodiment, the waste materials detected to have the same classifier by the material detector 100 are put together after sorting.

Figure 3:
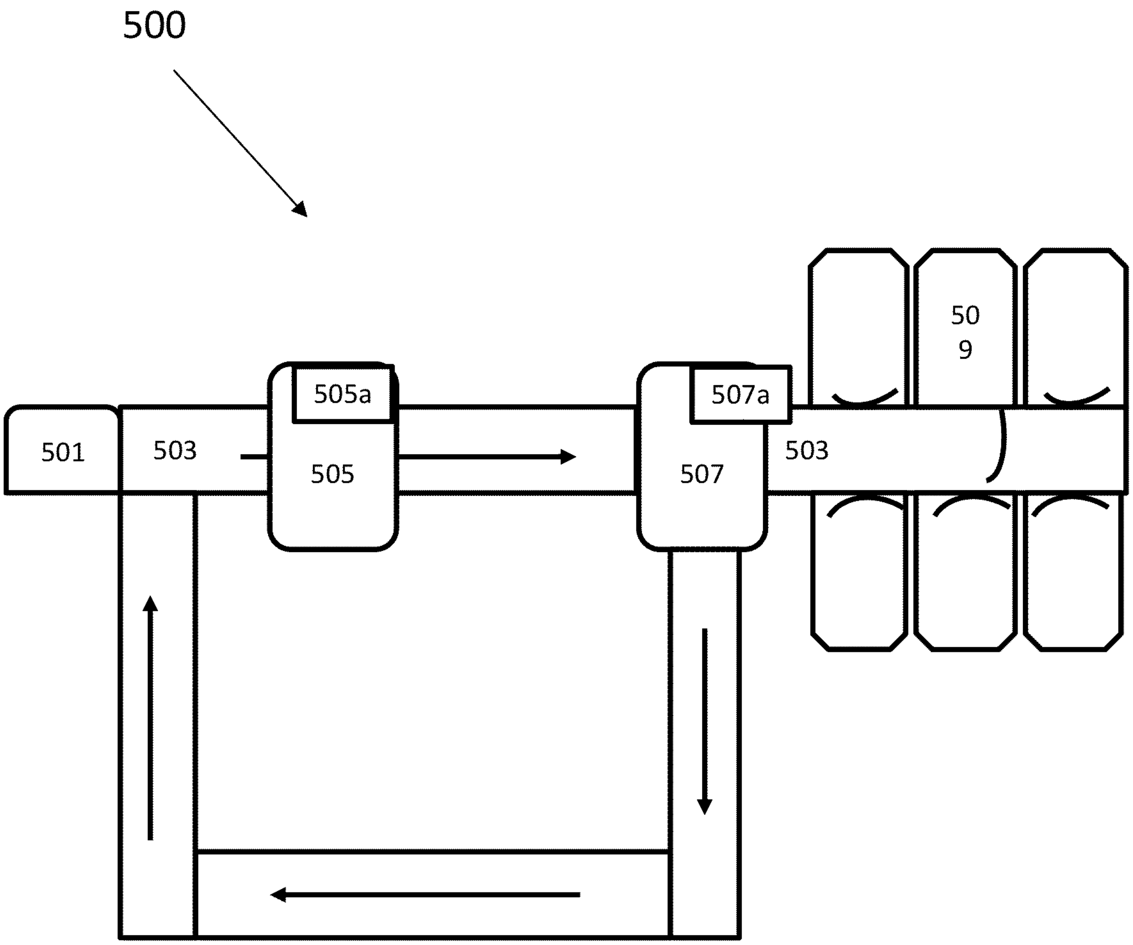
FIG. 3 depicts a segregation means 500 in accordance with an embodiment of the present invention.

An exemplary segregation means (or an automated segregation unit) 500 of a MRF plant (as shown in FIG. 3) where the material detector 100 of the present invention may be deployed is disclosed in Indian patent application number 202021044745. The segregation means (500) segregates the detected waste material. The automated segregation unit 500 includes one or more feeders 501, one or more optical decision makers 505, one or more optical sorters 507, and a plurality of storage units 509. A plurality of transport means 503 operationally couples the said components. The optical decision maker 505 is integrated with a first vision system **505*a* configured to categorize one or more materials present in a stream of mixed objects. The optical sorter 507 is integrated with a second vision system 507*a* configured to physically segregate the categorized one or more materials from the stream of mixed objects. The one or more optical decision makers 505 instructs the one or more optical sorters 507 to eject one or more categories of segregated objects to its respective storage unit 509. The material detector 100 of the present invention may operate in conjunction with the one or more optical decision maker 505 and/or one or more optical sorter 507 of the automated segregation unit 500. The one or more sensors 110 of the material detector 100 may be integrated with the first vision system 505*a* and/or second vision system 507*a* of the segregation means 500**.

Figure 4:
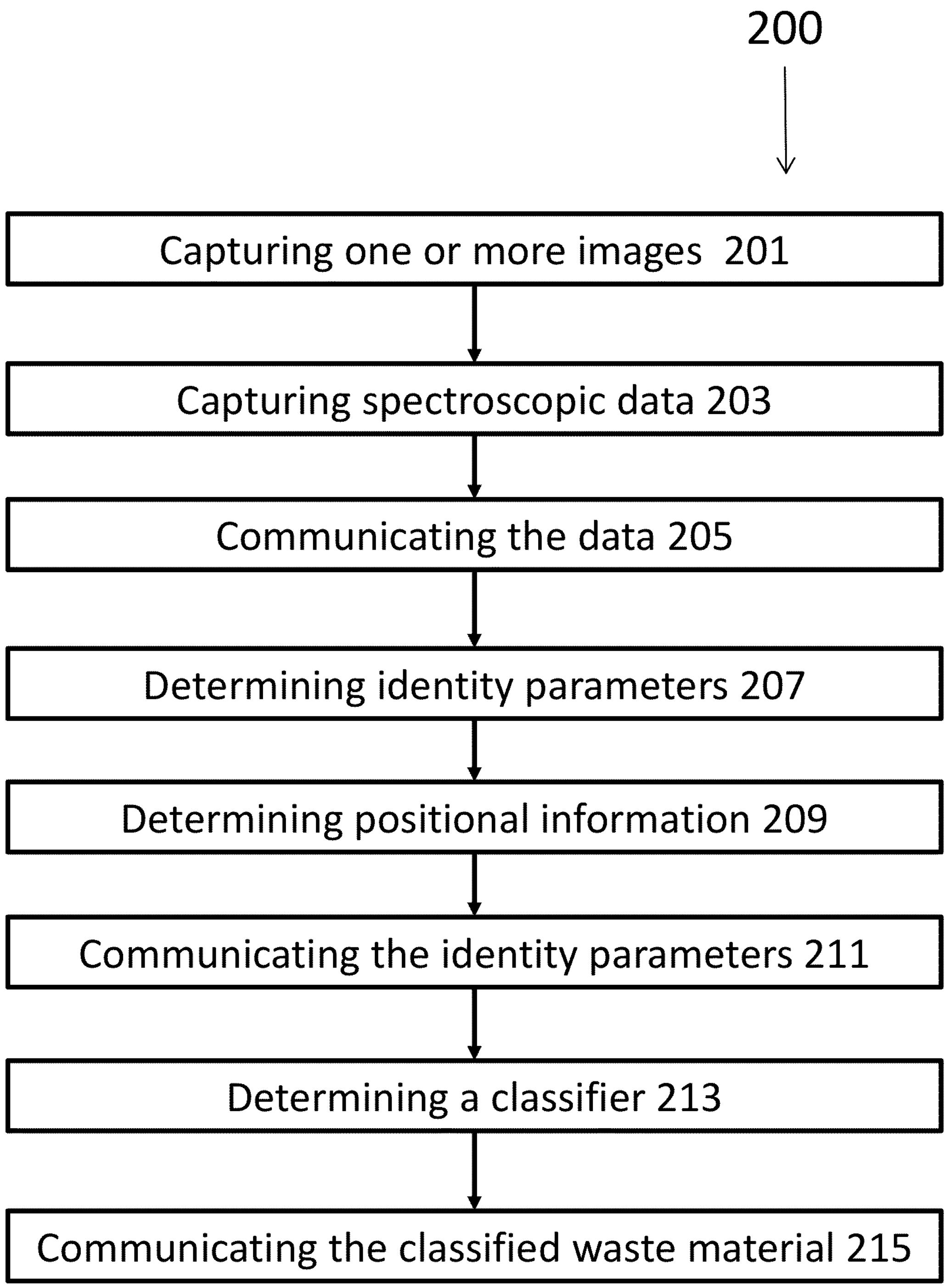
FIG. 4 illustrates a flowchart of a method 200 to detect a waste material by using the material detector in accordance with an embodiment of the present invention.

A method 200 to detect one or more types of waste materials by using the material detector 100 of the present invention is depicted in FIG. 4. The method 200 helps to detect the one or more waste materials irrespective of its state/condition of the waste material in the mixed waste stream. The method 200 may be initiated by human instruction or by any computer algorithm.

The method 200 begins at step 201, where the one or more sensors 110 may capture data of the one or more waste materials to be detected by the material detector 100. The sensors 110 may be in the form of an RGB optical camera (2D and/or 3D), an X-ray detector, a NIR camera, an Infrared camera, a SWIR camera, a LIDAR sensor, a height/depth sensor or a combination thereof. The image(s) captured by the sensor(s) 110 may be colored, greyscale, black and white, etc. In an exemplary embodiment, the material detector 100 includes a single RGB optical camera for capturing one or more images of the one or more waste materials. In an exemplary embodiment, the one or more sensors 110 are disposed over a conveyor belt carrying the mixed waste stream.

At an optional step 203, the one or more sensors 110 may also capture a spectroscopic data corresponding to the image captured. The spectroscopic data corresponds to a predefined wavelength spectrum having at least one of an absorbance, transmittance or reflectance by an outermost layer of the one or more waste materials.

At step 205, the data (images and/or spectroscopic data) may be communicated to the detection unit 120 of the material detector 100 via wired or wireless network.

At step 207, the detection unit 120 determines the one or more identity parameters of each of the one or more waste materials based on the inputs of the sensor(s) 110 in real-time.

In an exemplary embodiment, the image communicated by the sensor(s) 110 is analyzed by the neural network by breaking the image into a plurality of neural bits for each of the one or more waste materials. Neural bit may be defined as a small data container including one or more physical parameters and/or chemical parameters extracted from the data provided by the sensor(s) 110. The physical parameters may include one or more of a design, a color, a size (dimensions), a pre-introduced marker, a tracing pointer, a shape, a graphics/design/pattern/texture present on a label/ wrapper/surface, etc. of the waste material to be detected. The chemical parameters may include one or more of a chemical composition of the outermost layer of the waste material to be detected or characteristic chemical signatures (like, NIR markers). Each neural bit of each of the one or more waste materials may be fed into the neural network (ANN) of the detection unit 120. The neural network (ANN) then adds the neural bits on the basis of a probability function to derive a threshold value. The threshold value may be defined as a digital fingerprint of the one or more waste material.

Alternately, as discussed above, the processor of the detection unit 120 determines the one or more identity parameters of each of the one or more waste materials instead of the neural network by deriving a digital fingerprint based on to at least one physical parameter and/or chemical parameter associated with the one or more waste material.

At an optional step 209, the detection unit 120 of the material detector 100 also determines a positional information of each of the one or more waste material in their corresponding image data. The positional information may be used by the segregation means 500 to accurately and selectively segregate the one or more waste materials.

At step 211, the determined identity parameters of each of the one or more waste material(s) may be communicated to the comparison unit 130 of the material detector 100.

At step 213, the comparison unit 130 determines a classifier from the relationship table 10 using the predefined relation that maps the one or more identity parameters communicated to the comparison unit (130) by the detection unit (120) with other features of the waste material thereby accurately identifying the waste material.

In an exemplary embodiment, the comparison unit 130 compares the determined one or more identity parameters of each of the waste material within the one or more columns of the relationship table 10. The said comparison provides one or more other features of each of the one or more waste materials based on the determined identity parameters of each of the one or more waste materials. The one or more other features may include predetermined derivative data based on the identity parameters. For example, the one or more other feature columns may include a plurality of use-case feature (for example food grade, non-food grade, oil, chemical, etc.), a plurality of manufacturing technique/type feature (for example, film grade, extrusion grade, molding grade, injection molded, blow molded, etc.), chemical composition/structure, Material Flow Indexes (MFIS), etc.

At step 215, the classified waste material may be further communicated to any segregation means 500 of a MRF plant for its subsequent segregation. The physical segregation may be executed by without limitation a mechanical/robotic arm with suction grip/pneumatic valve, manifolds with pneumatic valves, mechanical flap system, etc.

Additionally or optionally, the classified waste material may be communicated to the segregation means 500 along with a positional information of the respective classified waste material. The positional information may help the segregation means 500 to selectively locate and segregate the classified waste material.

The present invention may be supported by the following examples:

Example 1 (Present invention): An end user instructed the material detector 100 of the present invention to segregate HDPE materials that were blow molded from a mixed waste stream. The one or more sensors 110 of the material detector 100 captured image(s) of the waste materials in the mixed waste stream. The image was then communicated to the detection unit 120 of the material detector 100. The detection unit 120 determined the brand and product type (identity parameters) of each of the waste materials present in the image based on the comparison between the derived digital fingerprint and the product database. The determined identity parameters of each of the waste materials were thereafter communicated to the comparison unit 130 by the detection unit 120. The comparison unit 130 mapped the determined identity parameters of each of the waste materials within the relationship table 10 to determine the following other features:

a. chemical composition/structure having material as HDPE; and b. blow molding manufacturing technique.

The comparison unit 130 determined the corresponding relevant classifier, i.e., IMSC 2 (from the relationship table 10 depicted in FIG. 2), for each of the correctly mapped waste materials. Thereafter, the classified waste material was communicated to a segregation means 500 of the MRF plant leading to accurate segregation as per the end-user needs.

The ability to selectively identify HDPE materials that were blow molded facilitates efficient downstream processing during recycling.

Example 2 (Present invention): An end user instructed the material detector 100 of the present invention to segregate food grade materials (used in food industries instead of other industries) from a mixed waste stream. The one or more sensors 110 of the material detector 100 captured image(s) of the waste materials in the mixed waste stream. The image was then communicated to the detection unit 120 of the material detector 100. The detection unit 120 determined the brand and product type (identity parameters) of each of the waste materials present in the image based on the comparison between the derived digital fingerprint and the product database. The determined identity parameters of each of the waste materials were thereafter communicated to the comparison unit 130 by the detection unit 120. The comparison unit 130 mapped the determined identity parameters of each of the waste materials within the relationship table 10 to determine the following other feature:

a. food grade use-case.

The comparison unit 130 determined the corresponding relevant classifier, i.e., IMSC 1, IMSC 4 and IMSC n (from the relationship table 10 depicted in FIG. 2), for each of the correctly mapped waste materials. Thereafter, the classified waste material was communicated to a segregation means 500 of the MRF plant leading to accurate segregation as per the end-user needs.

The ability to selectively identify food grade materials from non-food grade materials having same chemical composition/structure encourages quality sensitive industries (like food industries) to recycle their waste thereby reducing waste and resulting environmental burden.

Example 3 (Present invention): An end user instructed the material detector 100 of the present invention to segregate PP materials (Impact copolymer) having low MFI and PET material from a mixed waste stream. The one or more sensors 110 of the material detector 100 captured image(s) of the waste materials in the mixed waste stream. The image was then communicated to the detection unit 120 of the material detector 100. The detection unit 120 determined the brand and product type (identity parameters) of each of the waste materials present in the image based on the comparison between the derived digital fingerprint and the product database. The determined identity parameters of each of the waste materials were thereafter communicated to the comparison unit 130 by the detection unit 120. The comparison unit 130 mapped the determined identity parameters of each of the waste materials with the column of other features of the relationship table (i.e. melt flow index) to determine the following:

a. chemical composition/structure having material as PET as well as PP; and b. low MFI of the PP material.

The comparison unit 130 determined the corresponding relevant classifier, i.e., IMSC 3, IMSC 5 (from the relationship table 10 depicted in FIG. 2), for each of the correctly mapped waste materials. Thereafter, the classified waste material was communicated to a segregation means 500 of the MRF plant leading to accurate segregation as per the end-user needs.

The ability to selectively and accurately identify one or more tailor made classifiers as required by the end user helps in efficient operation of an MRF plant with wide variety of end user requirements. And this does not require any universal adoption/change in the consumption value chain nor any large capital investments.

Example 4 (Present invention): An end user instructed the material detector 100 of the present invention to segregate food grade materials (used in food industries instead of other industries) having an outer layer of BOPP, innermost layer of Surlyn with at least a layer of LDPE in between from a mixed waste stream. The one or more sensors 110 of the material detector 100 captured image(s) of the waste materials in the mixed waste stream. The image was then communicated to the detection unit 120 of the material detector 100. The detection unit 120 determined the brand and product type (identity parameters) of each of the waste materials present in the image based on the comparison between the derived digital fingerprint and the product database. The determined identity parameters of each of the waste materials were thereafter communicated to the comparison unit 130 by the detection unit 120. The comparison unit 130 mapped the determined identity parameters of each of the waste materials within the relationship table 10 to determine the following other feature:

a. chemical composition/structure outer layer as BOPP, innermost layer as Surlyn with at least a layer of LDPE in between; and b. food grade use-case.

The comparison unit 130 determined the corresponding relevant classifier, i.e., IMSC 1 (from the relationship table 10 depicted in FIG. 2), for each of the correctly mapped waste materials. Thereafter, the classified waste material was communicated to a segregation means 500 of the MRF plant leading to accurate segregation as per the end-user needs.

The ability to selectively and accurately identify one or more waste materials having a composite structure is a stepping stone in the field of material recovery. Not only does this enables the user to overcome the limitations of detection based on only the topmost layer, it also enables efficient downstream processing of these materials.

Although the above examples describe the operation of the present invention with one or two classifiers at a time, the comparison unit 130 of the material detector 100 of the present invention can be operated with any number of classifiers at a time as per the requirements of the end user.

The scope of the invention is only limited by the appended patent claims. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used.

I claim:

1. A material detector (100) used to identify a waste material irrespective of a state/condition of the waste material, the material detector (100) comprising:

one or more sensors (110) to capture an image of an outermost layer of at least one waste material;

a detection unit (120) including a neural network (ANN) to determine one or more identity parameters of the waste material by processing the image, wherein the one or more identity parameters include at least one of a brand and/or a product type of the waste material, and a comparison unit (130) determines a classifier of the waste material from a relationship table (10) using a predefined relation that maps the one or more identity parameters of the waste material with a melt flow index of the waste material to determine the identity of the waste material for accurate segregation.

2. The material detector (100) as claimed in claim 1, wherein the one or more sensors (110) include an RGB optical camera (2D and/or 3D), an X-ray detector, a NIR camera, an Infrared camera, a SWIR camera, a LIDAR sensor, a height/depth sensor or a combination thereof.

3. The material detector (100) as claimed in claim 1, further comprising a segregation means (500) for segregating the waste material, wherein the segregation means (500) includes one of a mechanical/robotic arm with a suction grip/pneumatic valve, a manifold with a pneumatic valve, or a mechanical flap system to physically segregate the waste material.

4. The material detector (100) as claimed in claim 1, wherein the at least one waste material includes multi-layered composite materials, materials from same industry or having closely related application in one or more industries, materials having similar manufacturing techniques, materials having similar melt flow indexes (MFI) or combinations thereof.

5. A method to identify a waste material in a mixed waste stream irrespective of a state/condition of the waste material by using a material detector (100), the method comprising:

capturing an image of an outermost layer of at least one waste material via one or more sensors (110);

determining one or more identity parameters of the waste material using the image communicated to a detection unit 120 by the one or more sensors (110), wherein the one or more identity parameters include at least one of brand and product type of the waste material; and determining a classifier of the waste material from a relationship table (10) using a predefined relation that maps the one or more identity parameters communicated to a comparison unit (130) by the detection unit (120) with melt flow index of the waste material, thereby accurately identifying the waste material.

6. The method (200) as claimed in claim 5, wherein the step of determining one or more identity parameters includes:

breaking data into a plurality of neural bits for each of the waste materials;

feeding the plurality of neural bits to a neural network (ANN) of the detection unit 120; and deriving a digital fingerprint by processing the plurality of neural bits, wherein the digital fingerprint is based on to at least one physical parameter and/or chemical parameter associated with the one or more waste material.

7. The method (200) as claimed in claim 5, wherein the step of determining one or more identity parameters includes processing the image using a processor by deriving a digital fingerprint based on at least one physical parameter and/or chemical parameter associated with the one or more waste materials.

8. The method (200) as claimed in claim 5, wherein the step of determining one or more identity parameters of the waste material includes determining a positional information of the waste material.

9. The method (200) as claimed in claim 5, further comprising communicating an information of the classified waste material to a segregation means (500) for subsequent segregation of the classified waste material.

10. The method (200) as claimed in claim 9, wherein the step of communicating the classified waste material to the segregation means (500) includes communicating positional information of the classified waste material.

11. The method (200) as claimed in claim 5, wherein the waste material includes multi-layered composite materials, materials from same industry or having closely related application in one or more industries, materials having similar manufacturing techniques, materials having similar melt flow indexes (MFI) or combinations thereof.

* * * * *